United States Patent
Zhou et al.

(10) Patent No.: US 8,661,145 B2
(45) Date of Patent: Feb. 25, 2014

(54) METHOD AND SYSTEM FOR TRANSMITTING A BEARER CONTROL MODE IN ROAMING SCENARIOS

(75) Inventors: Xiaoyun Zhou, Shenzhen (CN); Fei Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,593

(22) PCT Filed: Jan. 25, 2010

(86) PCT No.: PCT/CN2010/070349
§ 371 (c)(1),
(2), (4) Date: Sep. 29, 2011

(87) PCT Pub. No.: WO2011/029289
PCT Pub. Date: Mar. 17, 2011

(65) Prior Publication Data
US 2012/0158977 A1    Jun. 21, 2012

(30) Foreign Application Priority Data
Sep. 8, 2009   (CN) .......................... 2009 1 0169912

(51) Int. Cl.
*G06F 15/16*   (2006.01)
(52) U.S. Cl.
USPC ............ 709/228; 709/229; 709/250; 370/331
(58) Field of Classification Search
USPC ................. 709/217, 219, 227, 228, 250, 229; 455/436; 370/331
See application file for complete search history.

(56) References Cited

U.S. PATENT DOCUMENTS 8,145,232 B2 *  3/2012  Tamura et al. ............. 455/452.2
8,295,242 B2 * 10/2012  Rosenberg et al. .......... 370/331
(Continued)

FOREIGN PATENT DOCUMENTS

| CN | 101272534 A | 9/2008 |
| CN | 101459951 A | 6/2009 |

OTHER PUBLICATIONS

Zhao Yong et al. Jun. 6, 2009.
Li Haihua. Aug. 2009.

*Primary Examiner* — Viet Vu
(74) *Attorney, Agent, or Firm* — McClure, Qualey & Rodack, LLP (57) ABSTRACT

The present invention provides a method and system for transmitting a bearer control mode in a roaming scenario. The method includes: a home Policy and Charging Rules Function (hPCRF) sets a bearer control mode of an IP Connectivity Access Network (IP-CAN) session, and forwards the bearer control mode of the IP-CAN session to a visited Policy and Charging Rules Function (vPCRF) through an S9 subsession corresponding to the IP-CAN session; or, an hPCRF sets a bearer control mode of a gateway control session, and forwards the bearer control mode of the gateway control session to the vPCRF through an S9 subsession corresponding to the gateway control session. The system of the present invention includes an hPCRF and a vPCRF. The present invention enables the hPCRF to select different bearer control modes for a plurality of IP-CAN sessions established by a User Equipment (UE) and to forward to the vPCRF, and the vPCRF can further send the bearer control modes to the corresponding enforcement network elements to be executed.

6 Claims, 4 Drawing Sheets

(56) References Cited

U.S. PATENT DOCUMENTS

| | | | |
|---|---|---|---|
| 8,320,329 B2* | 11/2012 | Andreasen et al. | 370/331 |
| 2003/0147406 A1* | 8/2003 | Spear et al. | 370/401 |
| 2003/0214958 A1* | 11/2003 | Madour et al. | 370/401 |
| 2011/0065435 A1* | 3/2011 | Pancorbo Marcos et al. | 455/436 |
| 2012/0270589 A1* | 10/2012 | Guo et al. | 455/517 |

* cited by examiner

METHOD AND SYSTEM FOR TRANSMITTING A BEARER CONTROL MODE IN ROAMING SCENARIOS

CROSS REFERENCE RELATED APPLICATIONS

This application is a national phase of PCT/CN2010/070349 filed Jan. 25, 2010, which claims priority to China Application Serial No. 200910169912.0, filed Sep. 8, 2009, both of which are entirely incorporated herein by reference.

TECHNICAL FIELD

The present invention relates to the communication field, and particularly, to a method and system for transmitting a bearer control mode in a roaming scenario.

BACKGROUND OF THE RELATED ART

The Policy and Charging Control (referred to as PCC) architecture of 3GPP (3rd Generation Partnership Project) is a function framework that can be applied to multiple access technologies, for example, it can be applied to the Universal Mobile Telecommunications System (referred to as UMTS) Terrestrial Radio Access Network (referred to as UTRAN), the Global system for Mobile Communication (referred to as GSM)/GSM Enhanced Data rates for Global Evolution (referred to as EDGE) radio access network, interworking wireless local area network (I-WLAN) and the Evolved Packet System (referred to as EPS), and so on.

Figure 1:
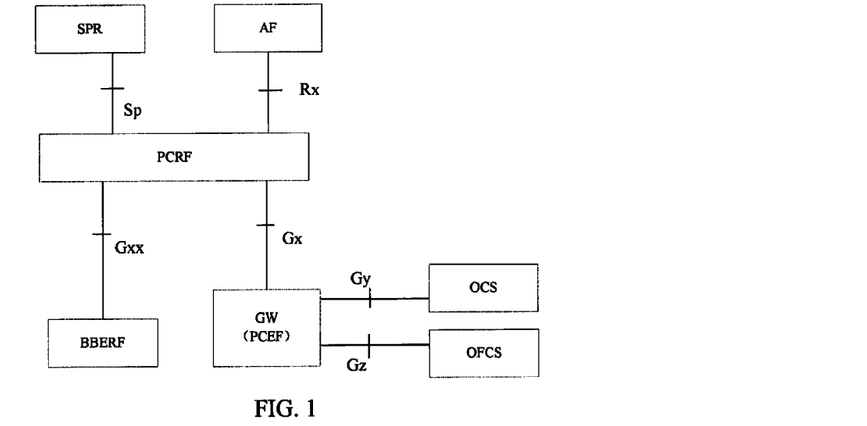
FIG. 1 is a diagram of a PCC non-roaming architecture in the related art.

FIG. 1 is a diagram of a Rel-8 PCC non-roaming architecture in the related art, in the following, functions of each logical function entity and its interface in the PCC architecture will be described with reference to FIG. 1: the Application Function (referred to as AF) entity provides a access point for service applications, and network resources used by these service applications need dynamic policy control. When performing the parameter negotiation in the service plane, the AF sends the relevant service information to the Policy and Charging Rules Function (referred to as PCRF) entity. If the service information is consistent with the PCRF policy, the PCRF accepts the negotiation; otherwise, the PCRF rejects the negotiation and in the feedback gives the service parameters acceptable by the PCRF. Subsequently, the AF returns these parameters to the user equipment (referred to as UE). The interface between the AF and the PCRF is the Rx interface.

The Policy Control and Charging Rules Function (PCRF) entity is the core of the PCC and it is responsible for making the policy decision and charging rules. The PCRF provides network control rules based on the service data flow, and these network controls comprise service data flow detection, Gating Control, quality of service (referred to as QoS) control and charging rules based on the data flow. The PCRF sends the made policy and charging rules to the Policy and Charging Enforcement Function (referred to as the PCEF) entity to enforce, and at the same time, the PCRF also needs to ensure that these rules are consistent with the user subscription information. The basis of the PCRF making the policy and charging rules comprises: acquiring the service-related information from the AF; acquiring the policy and charging control subscription information with the user from the user Subscription Profile Repository (referred to as SPR); acquiring the bearer-related network information from the PCEF.

The policy and control enforcement function (PCEF) entity is usually located in the Gate-Way (referred to as GW), the policy and charging rules made by the PCRF are enforced in the bearing plane. The PCEF detects the service data flows in accordance with the service data flow filter in the rules sent by the PCRF, and further enforces the policy and charging rules made by the PCRF on these service data flows. When establishing the bearer, the PCEF performs the QoS authorization in accordance with the rules sent by the PCRF and performs the gating control in accordance with the enforcement of the AF. According to the charging rule sent by the PCRF, the PCEF enforces the corresponding charging operation of the service data flow, and the charging is either online charging or offline charging. If it is the online charging, the PCEF needs to perform credit management with the online charging system (referred to as OCS). If it is the offline charging, the relevant charging information is exchanged between the PCEF and the offline charging system (referred to OFCS). The interface between the PCEF and the PCRF is the Gx interface, the interface between the PCEF and the OCS is the Gy interface, and the interface between the PCEF and the OFCS is the Gz interface. The PCEF is generally located in the network gateway, such as the GPRS Gateway Support Node (GGSN) in the GPRS and the Packet Data Gateway (referred to as PDG) in the I-WLAN.

The functions of the Bearer Binding and Event Reporting Function (referred to as BBERF) entity comprise bearer binding, upstream bearer binding verification, and event reporting. When the UE accesses through the E-UTRAN, and the PMIPv6 protocol is used between the Serving Gateway (referred to as S-GW) and the Packet Data Network Gateway (referred to as P-GW), the BBERF is located in the S-GW; when the UE accesses through the trusted non-3GPP access system, the BBERF is located in the trusted non-3GPP access gateway; and when the UE accesses through the un-trusted non-3GPP access system, the BBERF is located in the Evolved Packet Data Gateway (referred to as ePDG). At that moment, the PCEF no longer enforces the bearer binding function.

The SPR stores the user policy and charging control subscription information related to the policy control and charging. The interface between the SPR and the PCRF is the Sp interface.

The OCS and the PCEF together control and manage the user credit under the online charging mode.

The OFCS and the PCEF together finish the charging operation under the offline charging mode.

The PCC architecture, through each of the above function entities, realizes the policy and charging control of the IP Connectivity Access Network (referred to as IP-CAN) established by the UE for accessing one Packet Data Network (referred to as PDN).

In the packet system (such as EPS, UMTS, and so on), the bearer is the basic unit for the network providing the QoS guarantee to the service data flow transmission. Different bearers have different QoS Class Identifiers (referred to as QCIs) and Allocation and Retention Priorities (referred to as ARPs), and the service data flows transmitted in the same bearer have the same QCI and ARP. Each network element in the packet network adopts the same packet forwarding and processing mechanism to the service data flows transmitted in the same bearer, and adopts different packet forwarding and processing mechanisms to the service data flows transmitted in different bearers. The PCC architecture realizes the policy control of the packet system by establishing, modifying and terminating the bearers with different QoS capabilities. The bearers usually can be initiated, established, and controlled by the network or the UE. Currently, in the PCC architecture, there are two bearer control modes: UE_Only and UE_NW. The UE-Only indicates that all the bearers in the IP-CAN session established by the UE must be controlled by the UE, that is, the UE decides the establishment, modification and release of the bearers. The UE-NW indicates that the bearers in the IP-CAN session established by the UE can be controlled by the UE or the network, that is, either the UE or the network can decide the establishment, modification and release of the bearers.

In the current techniques, the protocol adopted in the PCC architecture is the Diameter application protocol developed on the basis of the Diameter Base Protocol, for example, the application protocol used in the Gx interface, the application protocol used in the Rx interface, the application protocol of the Gxx interface (including Gxa and Gxc interfaces) and the application protocol used in the roaming interface S9. In these application protocols, messages, commands, and AVP (Attribute Value Pairs), and so on used for the PCC are defined. Diameter sessions established with these protocols can respectively become Gx session, Gxx session, Rx session and S9 session. Each function entity of the PCC performs the policy and charging control, through these sessions, to the PDN connection established when the UE accesses the network.

Figure 2:
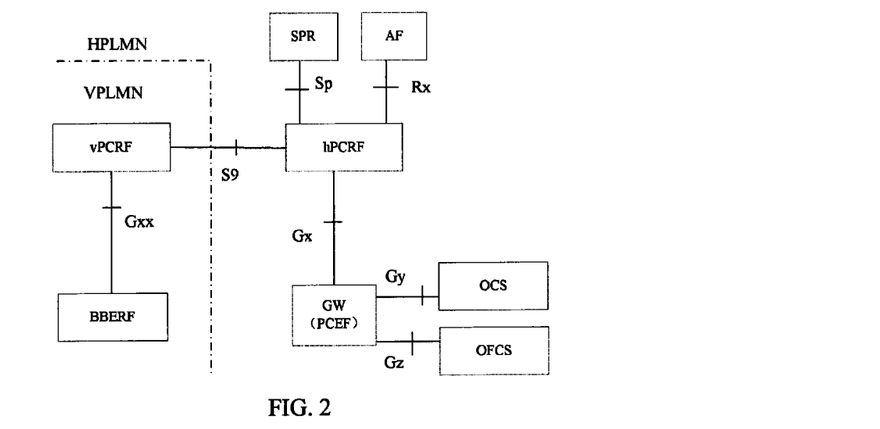
FIG. 2 is a diagram of a PCC architecture in a roaming scenario of home routed in the related art.
Figure 3:
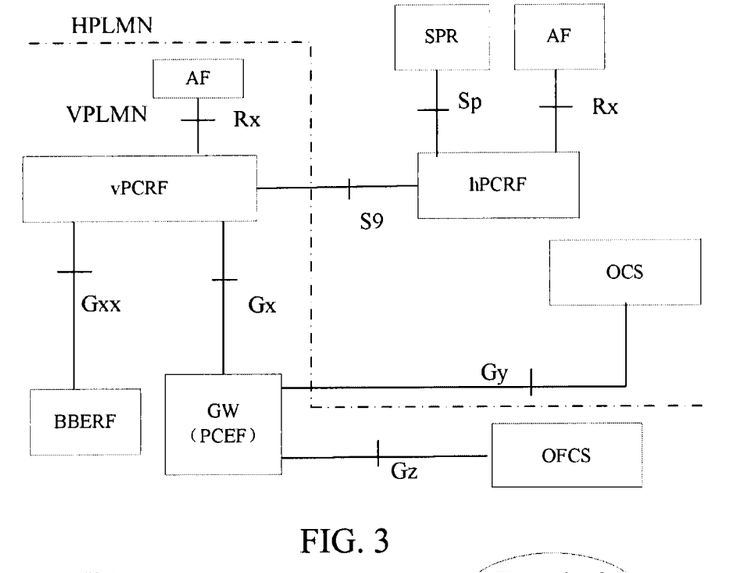
FIG. 3 is a diagram of a PCC architecture in a roaming scenario of local breakout in the related art.

FIGS. 2 and 3 are structural diagrams of the PCC respectively in two roaming scenarios of home routed and local breakout. The PCRF in the home network (i.e., Home Public Land Mobile Network (HPLMN)) is the hPCRF (home policy control and charging rules function entity), and the PCRF in the visited network (i.e., Visit Public Land Mobile Network (VPLMN)) is the vPCRF (visited policy control and charging rules function entity). In the scenario of home routed, the PCEF is in the home network, and if there is a BBERF, the BBERF is in the visited network. In the roaming scenario of local breakout, the PCEF is in the visited network, and if there is a BBERF, the BBERF is also in the visited network.

At present, the scheme for implementing the S9 roaming interface is for each UE, the vPCRF terminates the Gx session and Gxx session existing in the visited network of all the IP-CAN sessions established by the UE, and one S9 session is used to transmit the information of the Gx session and Gxx session of all the IP-CAN sessions; however, it does not terminate the Rx session of all the IP-CAN sessions in the visited network, and just forwards the messages of the Rx session to the hPCRF, in which the vPCRF is taken as a proxy. There might be a plurality of subsessions (called S9 subsessions) in one S9 session. Each subsession is used to transmit the information of the Gx and Gxx sessions of one IP-CAN session. When the hPCRF sends the policy control information to the vPCRF, and if the information is issued in the command level (that is, the information is not included in any subsession), the vPCRF considers that the information will be applied to all the IP-CAN sessions of the UE; and if the information is issued in the subsession level (that is, the information is included in the subsession), the vPCRF considers that the information is only used to the IP-CAN session corresponding to the subsession. At present, the hPCRF only can issue the bearer control modes in the command level, which limits that the hPCRF has no ability of deciding different bearer control modes for different IP-CAN sessions of the UE according to the subscription information, the network policy and the network ability. For example, the UE establishes two IP-CAN sessions, and the two IP-CAN sessions select two GGSNs, while the abilities of the two GGSNs are inconsistent. One GGSN supports the bearer establishment initiated by the network, but the other GGSN does not support. Therefore, the bearer control modes selected by the PCRF for the two IP-CAN sessions might be different. Of course, The PCRF can also select different bearer control modes according to the difference of the PDN networks to which the two IP-CAN sessions access, which depends on the network policy.

Figure 4:
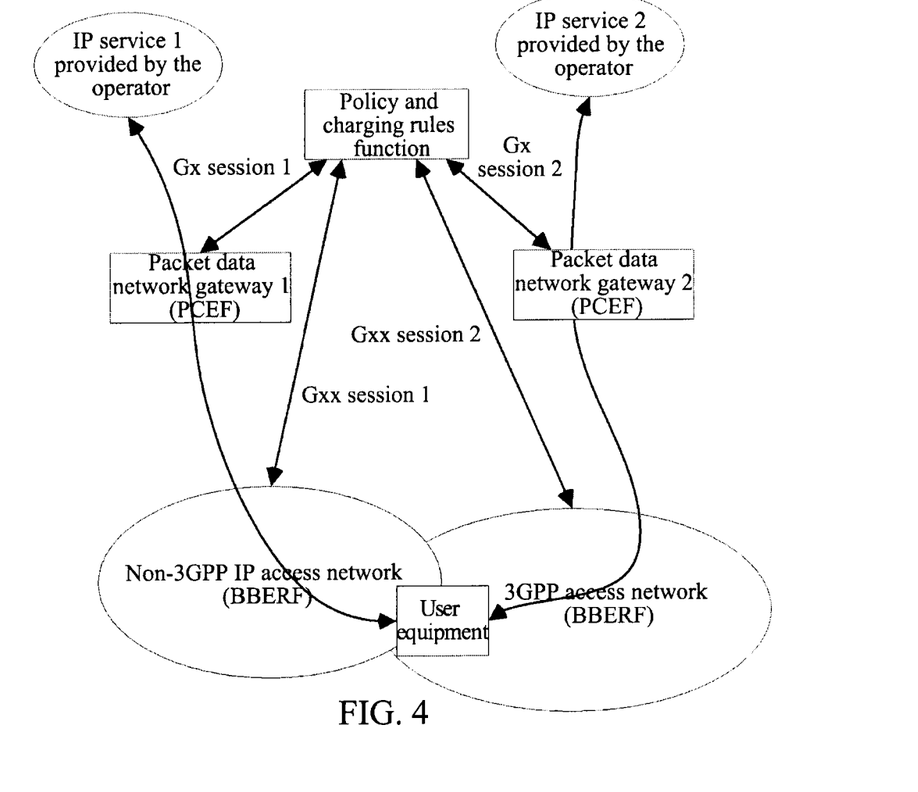
FIG. 4 is a schematic diagram of multi-access in the related art.

The defect of the above scheme is that, the hPCRF have no ability of adopting different bearer control modes for different IP-CAN sessions of the UE according to different access network capabilities, which is caused in the multi-access scenario. Multi-access supports that the UE accesses various PDNs through different P-GWs by a variety of access networks at the same time. As shown in FIG. 4, the UE accesses the PDN1 and PDN2 through the non-3GPP IP access network and 3GPP access network simultaneously under the coverage of the non-3GPP access and the 3GPP access. As the network abilities of the access networks are different (for example, one network does not support the bearer establishment initiated by the network, and so on), different bearer control modes should be applied for the PDN connections accessed and established by the UE through different access networks, however, the hPCRF cannot configure different bearer control modes for the PDN connection.

SUMMARY OF THE INVENTION

In order to solve the technical problem in the related art, the present invention provides a method and system for transmitting a bearer control mode in a roaming scenario, so as to solve the problem that the hPCRF cannot set different bearer control modes for different IP-CAN sessions in the related art.

In order to solve the aforementioned technical problem, the present invention provides a method for transmitting a bearer control mode in a roaming scenario, comprising:

a home policy control and charging rules function entity (hPCRF) setting a bearer control mode of an IP connectivity access network (IP-CAN) session, and sending the bearer control mode of the IP-CAN session to a visited policy control and charging rules function entity (vPCRF) through an S9 subsession corresponding to the IP-CAN session;

or, an hPCRF setting a bearer control mode of a gateway control session, and sending the bearer control mode of the gateway control session to a vPCRF through an S9 subsession corresponding to the gateway control session.

The aforementioned method can also comprise:

the vPCRF sending the bearer control mode to a policy and charging enforcement function entity (PCEF) or a bearer binding and event reporting function entity (BBERF).

The aforementioned method can also have the following feature:

the hPCRF sets the bearer control mode of the IP-CAN session according to network requested support (NRS), access network information, subscription information and network policy.

The aforementioned method can also have the following feature:

before the step of the hPCRF setting the bearer control mode of the IP-CAN session, and sending to the vPCRF, the vPCRF sends the NRS to the hPCRF through the S9 subsession corresponding to the IP-CAN session.

The method can also have the following feature:

before the step of the hPCRF setting the bearer control mode of the gateway control session, and sending to the vPCRF, the vPCRF sends the NRS to the hPCRF through the S9 subsession corresponding to the gateway control session.

In order to solve the above technical problem, the present invention also provides a system for transmitting a bearer control mode in a roaming scenario, and the system comprises an hPCRF and a vPCRF, the hPCRF is configured to set a bearer control mode of an IP-CAN session, and send to the vPCRF through an S9 subsession corresponding to the IP-CAN session.

The aforementioned system can also have the following feature:

the vPCRF is configured to send the bearer control mode to a PCEF or a BBERF.

The aforementioned system can also have the following feature:

the hPCRF is configured to set the bearer control mode of the IP-CAN session according to NRS, access network information, subscription information and network policy.

In order to solve the above technical problem, the present invention also provides a system for transmitting a bearer control mode in a roaming scenario, and the system comprises an hPCRF and a vPCRF, the hPCRF is configured to set a bearer control mode of a gateway control session, and send to the vPCRF through an S9 subsession corresponding to the gateway control session.

The aforementioned system can also have the following feature:

the vPCRF is configured to send the bearer control mode to a BBERF.

The present invention makes the hPCRF be able to select different bearer control modes for a plurality of IP-CAN sessions established by the UE and send the bearer control modes to the vPCRF, and the vPCRF can further send the bearer control modes to the corresponding enforcement network elements to enforce.

PREFERRED EMBODIMENTS OF THE PRESENT INVENTION

In the present invention, an hPCRF sets a bearer control mode of an IP-CAN session, and sends to a visited policy control and charging rules function entity (vPCRF) through an S9 subsession corresponding to the IP-CAN session; or, the hPCRF sets a bearer control mode of a gateway control session, and sends to the vPCRF through an S9 subsession corresponding to the gateway control session.

The vPCRF sends the bearer control mode to a PCEF or a BBERF.

The PCEF then sends the bearer control mode to the UE and other network elements related to the IP-CAN session, and the UE and each network element apply the bearer control mode to the IP-CAN session.

The BBERF then sends the bearer control mode to the UE and other network elements related to the gateway control session, and the UE and each network element apply the bearer control mode to the gateway control session.

In the following, the preferred embodiments of the present invention will be described in combination with the accompanying drawings, and it should be understood that the preferred embodiments described here are only used to illustrate and explain the present invention, and are not intended to limit the present invention. It should be noted that, in the case of no conflict, the embodiments in this application as well as the features in the embodiments can be combined with each other.

The First Embodiment

Figure 5:
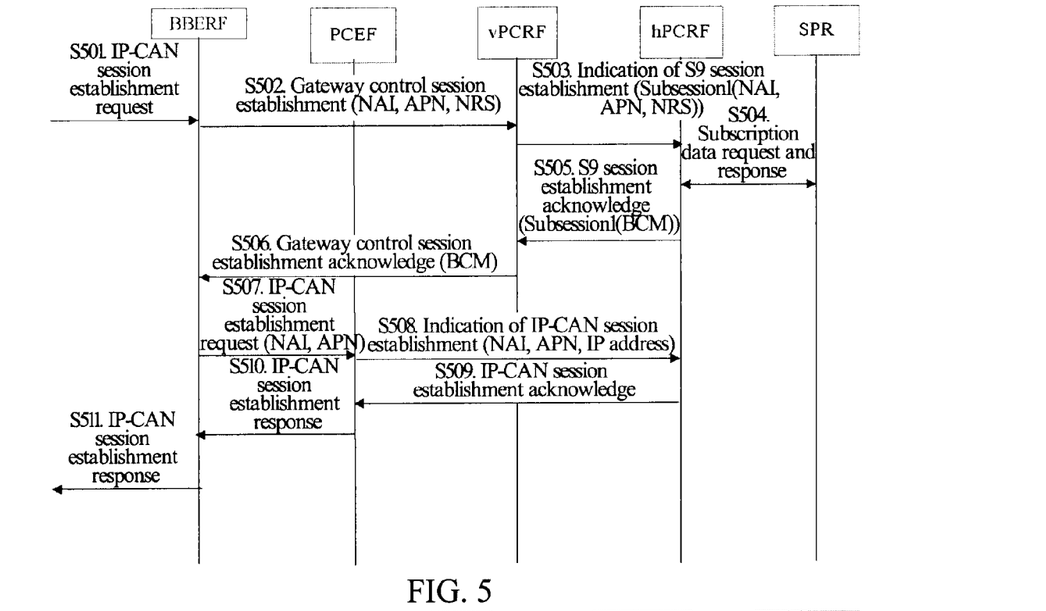
FIG. 5 is a flow chart of a first embodiment of the present invention.

This embodiment describes the flow chart of the UE accessing through the trusted non-3GPP access gateway and establishing the IP-CAN session in the roaming scenario of home routed, wherein, the PMIPv6 protocol is adopted between the access gateway and the P-GW, and the specific steps are as follows:

step S501, the BBERF receives an IP-CAN session establishment request message, and the message carries a user identification NAI (Network Access Identifier) and a PDN identification APN (Access Point Name);

step S502, the BBERF sends a gateway control session establishment request message to the vPCRF, and the message carries the user identification NAI, the PDN identification APN, an indication NRS (Network Requested Support) of whether the UE and the access network support a network initiation flow, a BBERF address and an access network information for making the policy (i.e., bearer attribute). The Diameter session which the message requests to establish is expressed as the Gxx session1;

step S503, the vPCRF determines that the user is a roaming user according to the NAI, and determines that an S9 is not established for the user, therefore, the vPCRF sends an indication message of S9 session establishment to the hPCRF to request to establish an S9 subsession (Subsession1), and the NAI, the APN, the NRS, the access network information and the BBERF address are contained in the Subsession1;

step S504, if the hPCRF does not have user-related subscription information, the hPCRF interacts with the SPR to obtain the subscription information;

step S505, the hPCRF makes default PCC rules and the corresponding QoS rules for the IP-CAN session that the UE requests to establish according to the subscription information, the network policy and the bearer attribute, and so on. At the same time, the hPCRF sets the Bearer Control Mode (referred to as BCM) of the IP-CAN session according to the NRS, the access network information, the subscription information and the network policy. The hPCRF returns an S9 session establishment acknowledge message to the vPCRF, and the QoS rules and the BCM are included in the Subsession1;

step S506, the vPCRF sends the QoS rules and the BCM to the BBERF through a gateway control session establishment acknowledge message. The BBERF installs the QoS rules. The trusted non-3GPP access network, according to the BCM, applies the bearer control mode indicated in the BCM to the gateway control session requesting to be established. In this scenario, the gateway control session and the IP-CAN session is one to one correspondence. Therefore, it can be also considered that the bearer control mode indicated in the BCM will be applied to the IP-CAN session requesting to be established;

step S507, the gateway in which the BBERF resides sends the IP-CAN session establishment request message to the gateway in which the PCEF resides, and the message carries the NAI and the APN;

step S507 can be sent simultaneously with step S502.

Step S508, the gateway in which the PCEF resides assigns an IP address to the IP-CAN session which the UE requests to establish. The PCEF sends an indication message of IP-CAN session establishment to the hPCRF, and the message carries the NAI, the APN and the IP Address. The Diameter session that the message requests to establish is expressed as the Gx session1;

step S509, the hPCRF associates the Gx Session1 with the Subsession1 according to the NAI and the APN. The hPCRF sends the PCC rules made in step S505 to the PCEF;

step S510, the PCEF installs the PCC rules. The gateway in which the PCEF resides returns an IP-CAN session establishment response message to the BBERF;

step S511, the BBERF returns the IP-CAN session establishment response message.

The BBERF might again send the bearer control mode to the UE and other network elements in the trusted non-3GPP access network. The UE and the trusted non-3GPP access network manage the IP-CAN session bearer, such as establishment, modification and release of the bearer, according to the indication of the BCM.

When the UE decides to initiate establishing a second IP-CAN session, (1) if, in a single-access scenario, the BBERF sends a gateway control session establishment request message to the vPCRF (the Diameter session requesting to be established is the Gxx session2), and the message carries the NAI and the APN', the vPCRF sends an indication message of S9 session modification to the hPCRF, and requests to establish the S9 subsession (Subsession2), wherein the NAI, the APN' and the NRS (since it is the single access, the NRS is consistent with the first IP-CAN session) are included in the Subsession2. The hPCRF decides the BCM' of the second IP-CAN session according to the subscription information, the access network information, the network policy and the NRS, and sends to the vPCRF through the Subsession2 of the S9 session modification message. The BBERF might again send the bearer control mode to the UE and other network elements in the trusted non-3GPP access network. The UE and the trusted non-3GPP access network manage the second IP-CAN session bearer, such as establishment, modification and release of the bearer, according to the indication of the BCM'. The BCM and the BCM' might be not the same.

(2) If, in the multi-access scenario, the BBERF' in another access network sends a gateway control session establishment request message to the vPCRF (the Diameter session requesting to be established is the Gxx session2), and the message carries the NAI and the APN', then the vPCRF sends an indication message of S9 session modification to the hPCRF, and requests to establish the S9 subsession (Subsession2), wherein the NAI, the APN, and the NRS' (because it is multi-access, the NRS' might be different from the NRS of the first IP-CAN session) are included in the Subsession2. The hPCRF decides the BCM' of the second IP-CAN session according to the subscription information, the access network information, the network policy and the NRS', and sends to the vPCRF through the Subsession2 of the S9 session modification message. The vPCRF sends the BCM' to the BBERF' through the gateway control session establishment acknowledge message of the Gxx session2. The BBERF' might again send the bearer control mode to the UE and other network elements in the trusted non-3GPP access network. The UE and the trusted non-3GPP access network manage the second IP-CAN session bearer, such as establishment, modification and release of the bearer, according to the indication of the BCM'. The BCM and BCM' might be not the same.

The Second Embodiment

Figure 6:
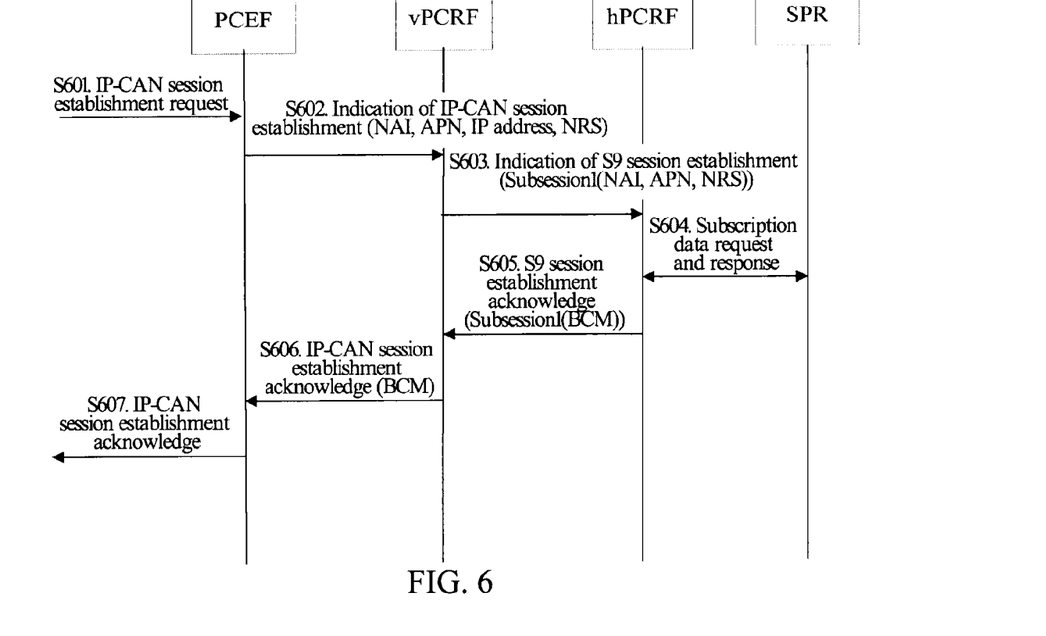
FIG. 6 is a flow chart of a second embodiment of the present invention.

This embodiment describes the flow chart of the UE establishing the IP-can session when accessing through the 3GPP access gateway in the roaming scenario of local breakout, and the specific steps are as follows:

step S601, the gateway in which the PCEF resides receives the IP-CAN session establishment request message, and assigns an IP address to the IP-CAN session;

step S602, the PCEF sends an indication message of IP-CAN session establishment to the vPCRF, and the message carries the NAI, the APN, the NRS and the IP Address. The Diameter Session requested to be established by the message is the Gx session1. The NRS indicates whether the gateways in which the UE, the access network and the PCEF reside support the network initiation flow;

step S603, the vPCRF determines that the user is a roaming user according to the NAI, and an S9 session is not established for the user, therefore, the vPCRF sends an indication message of S9 session establishment to the hPCRF, and requests to establish the S9 subsession Subsession1, wherein the NAI, the APN, and the NRS are included in the Subsession1;

step S604, if the hPCRF does not have the user-related subscription information, the hPCRF interacts with the SPR to obtain the subscription information;

step S605, the hPCRF makes the default PCC rules according to the IP-CAN session requested to be established by the UE, such as the subscription information, the network policy and the bearer attribute, and so on. At the same time, the hPCRF sets the BCM of the IP-CAN session according to the NRS, the access network information, the subscription information and the network policy. The hPCRF returns an S9 session establishment acknowledge message to the vPCRF, and the PCC rules and the BCM are included in the Subsession1;

step S606, the vPCRF sends the PCC rules and the BCM to the PCEF through the IP-CAN session establishment acknowledge message of the Gx session1. The PCEF installs the PCC rules, and meanwhile, according to the BCM, applies the bearer control mode in the message to the IP-CAN session requested to be established;

step S607, the gateway in which the PCEF resides returns the IP-CAN session establishment response message.

The PCEF might again send the bearer control mode to the UE and other network elements in the 3GPP access network. The UE and the 3GPP access network manage the IP-CAN session bearer, such as the establishment, modification and release of the bearer, according to the indication of the BCM.

(1) If the UE decides to initiate to establish a second IP-CAN session (i.e., single access) through the 3GPP access network, and the selected PCEF' is different from the anterior one, then the PCEF' sends an IP-CAN session establishment request message to the vPCRF (the Diameter session requested to be established is the Gx session2), wherein the message carries the NAI, the APN' and the NRS' (as the selected PCEFs are different, the NRS' and the NRS might be inconsistent), and the vPCRF sends an indication message of S9 session modification to the hPCRF and requests to establish the S9 subsession Subsession2, wherein the NAI, APN' and the NRS' are included in the Subsession2. The hPCRF decides the BCM' of the second IP-CAN session according to the subscription information, the access network information, the network policy and the NRS', and sends to the vPCRF through the Subsession2 of the S9 session modification message. The vPCRF sends the BCM' to the PCEF' through the IP-CAN session establishment acknowledge message of the Gx session2. The PCEF' might again send the bearer control mode to the UE and other network elements in the 3GPP access network. The UE and the 3GPP access network manage the second IP-CAN session bearer, such as the establishment, modification and release of the bearer, according to the indication of the BCM'. The BCM and the BCM' might be different.

(2) If the change of the NRS is caused by the switching of the UE, the PCEF sends the indication message of IP-CAN session modification which carries the new NRS' to the vPCRF through the Gx session1, and the vPCRF sends the NRS' to the hPCRF through the Subsession1. The hPCRF decides the new BCM' according to the subscription information, the access network information, the network policy and the NRS', and sends to the vPCRF through the Subsession1. The vPCRF sends the BCM' to the PCEF through the IP-CAN session modification acknowledge message of the Gx session1. The PCEF might again send the bearer control mode to the UE and other network elements in the 3GPP access network. The UE and the 3GPP access system manage the modified IP-CAN session bearer according to the indication of the BCM'.

(3) If the UE decides to initiate to establish a second IP-CAN session (i.e., multi-access) through another non-3GPP access, the BBERF' of another access network sends a gateway control session establishment request message to the vPCRF (the Diameter session requested to be established is the Gxx session2), wherein the message carries the NAI and the APN', and the vPCRF sends an indication message of S9 session modification to the hPCRF and requests to establish the S9 subsession Subsession2, wherein the NAI, the APN' and the NRS' (since it is multi-access, the NRS' might be different from the NRS of the first IP-CAN session) are contained in the Subsession2. The hPCRF decides the BCM' of the second IP-CAN session according to the subscription information, the access network information, the network policy and the NRS', and sends to the vPCRF through the Subsession2 of the S9 session modification message. The vPCRF sends the BCM' to the BBERF' through the gateway control session establishment acknowledge message of the Gxx session2. The BBERF might again send the bearer control mode to the UE and other network elements in the non-3GPP access network. The UE and the trusted non-3GPP access network manage the second IP-CAN session bearer, such as the establishment, modification and release of the bearer, according to the indication of the BCM'. The BCM and the BCM' might be different.

The Third Embodiment

Figure 7:
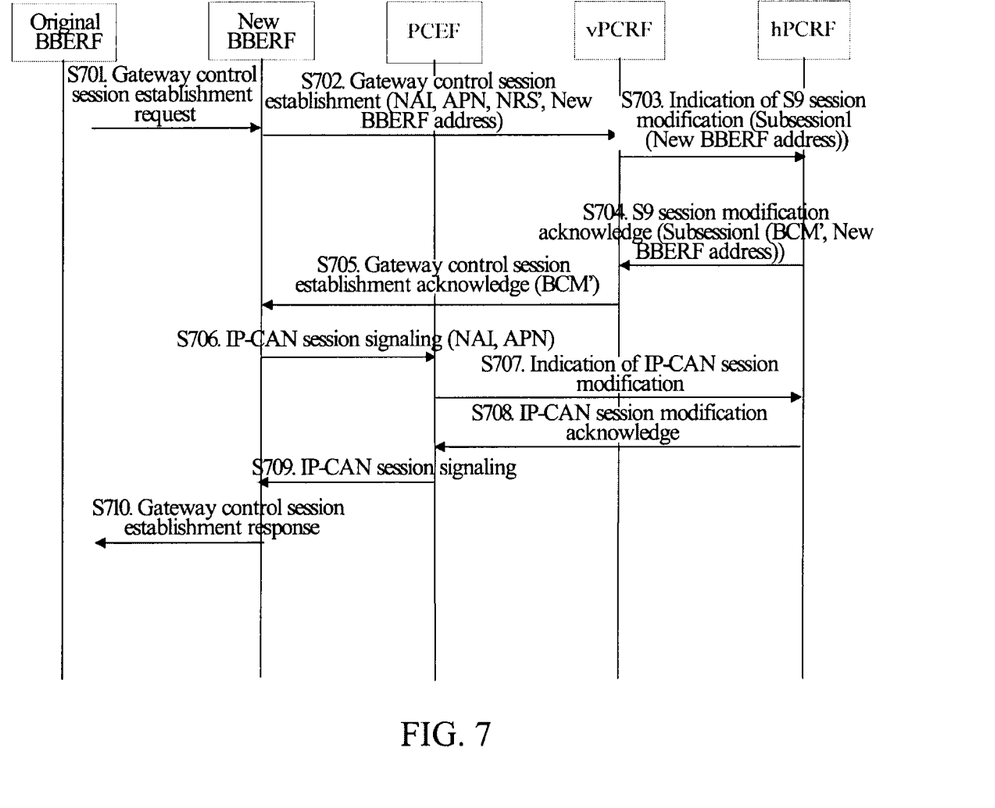
FIG. 7 is a flow chart of a third embodiment of the present invention.

This embodiment describes the switching flow of the UE switching to another trusted non-3GPP access gateway after the IP-CAN session established by the flow in FIG. 5, wherein, the PMIPv6 protocol is adopted between the new access gateway and the P-GW, and as shown in FIG. 7, the specific steps are as follows:

step S701, the new BBERF receives the gateway control session establishment request message sent by the Old BBERF, and the New BBERF obtains the user identification NAI, the PDN identification APN and the access network information for making the policy; step S702, the New BBERF sends a gateway control session establishment request message to the vPCRF, and the message carries the user identification NAI, the PDN identification APN, the New BBERF address, whether the UE and the access network supporting the network initiation flow indication NRS' (Network Requested Support), and the access network information for making the policy. The Diameter session requested to be established by the message is the Gxx session2;

step S703, the vPCRF determines that the user is a roaming user according to the NAI, and determines that the S9 session and the S9 subsession Subsession1 have been established for the user according to the user identification NAI and the PDN identification APN. Therefore, the vPCRF sends an indication message of S9 session modification to the hPCRF, and includes the NRS', the New BBERF address and the access information for making the policy in the Subsession1;

step S704, the hPCRF determines that the UE has switched (such as BBERF relocation) according to the New BBERF address, and modifies the previous PCC rules and QoS rules made for the UE before according to the subscription information, the access network information, the network policy, and the new access network information, and so on. At the same time, the hPCRF sets a new BCM' of the IP-CAN session according to the NRS', the subscription information and the network policy. The hPCRF returns an S9 session establishment acknowledge message to the vPCRF, and the QoS rules, the BCM' and the New BBERF address is included in the Subsession1. The BCM' and the previous BCM before the switch might be different;

step S705, the vPCRF determines that the information in the Subsession1 is sent to the New BBERF according to the New BBERF address, therefore, the vPCRF sends the QoS rules and the BCM' to the New BBERF through the gateway control session establishment acknowledge message sent by the Gxx session2. The new BBERF installs the QoS rules, and meanwhile, according to the BCM, the new BBERF applies the bearer control mode indicated in it to the gateway control session requested to be established. Similarly, in this scenario, the newly established gateway control session and the modified IP-CAN session are one to one correspondence. Therefore, it can be also considered that the BBERF, according to the BCM, applies the bearer control mode indicated in it to the IP-CAN session;

step S706, the gateway in which the New BBERF resides sends the IP-CAN session signaling to the gateway in which the PCEF resides, and the message carries the NAI and the APN. The message is usually the proxy binding update message during the implementation;

step S706 and step S702 can be sent simultaneously.

step S707, the gateway in which the PCEF resides assigns the IP address before the switch to the UE according to the user identification and the PDN identification. The PCEF sends an indication message of IP-CAN session modification to the hPCRF, and the message carries the NAI, the APN and the IP Address. The Diameter session requested to be modified by the message is the Gx session1 established in FIG. 5;

step S708, the hPCRF sends the PCC rules making in step S704 to the PCEF;

the hPCRF might modify the PCC rules and the QoS rules made in step S704, at this time, the hPCRF sends the modified PCC rules to the PCEF and sends the modified QoS rules to the BBERF through the vPCRF.

Step S709, the PCEF installs the PCC rules. The gateway in which the PCEF resides returns the IP-CAN session signaling carrying the IP address to the BBERF. The message is usually the proxy binding update acknowledge message during the implementation;

step S710, the New BBERF returns the gateway control session establishment response message.

The BBERF might again send the bearer control mode to the UE and other network elements in the non-3GPP access network. The UE and the trusted non-3GPP access system manage the IP-CAN session bearer, such as the establishment, modification and release of the bearer, according to the indication of the BCM'.

As shown in FIG. 3, the system for transmitting a bearer control mode in a roaming scenario in accordance with an embodiment of the present invention comprises an hPCRF and a vPCRF, the hPCRF is configured to set the bearer control mode of an IP-CAN session, and send to the vPCRF through the S9 subsession corresponding to the IP-CAN session.

The vPCRF is configured to send the bearer control mode to the PCEF or the BBERF.

The hPCRF is configured to set the bearer control mode of the IP-CAN session according to the NRS, the access network information, the subscription information and the network policy.

As shown in FIG. 2, the system for transmitting a bearer control mode in a roaming scenario in accordance with an embodiment of the present invention comprises an hPCRF and a vPCRF, the hPCRF is configured to set the bearer control mode of a gateway control session, and send to the vPCRF through the S9 subsession corresponding to the gateway control session.

The vPCRF is configured to send the bearer control mode to the BBERF.

Obviously, those skilled in the art should understand that, each above module or each above step of the present invention can be implemented with a universal computing device, the modules or steps can be integrated on a single computing device or distributed in a network composed of a plurality of computing devices, and optionally, the modules or steps can be implemented with program code that is executable by the computing device, thus they can be stored in the storage device and executed by the computing device, or they can be made into various integrated circuit modules, or some of the modules or steps can be produced into a single integrated circuit module to achieve. Thus, the present invention is not limited to any specific combination of hardware and software.

Of course, the present invention might also have many other embodiments, without departure from the spirit and essence of the present invention, those skilled in the art can make various modifications and variations according to the present invention, and these modifications and variations should belong to the scope of the appending claims of the present invention.

INDUSTRIAL APPLICABILITY

Compared with the related art, the present invention makes the hPCRF be able to select different bearer control modes for a plurality of IP-CAN sessions established by the UE and send the bearer control modes to the vPCRF, and the vPCRF can further send the bearer control modes to the corresponding enforcement network elements to enforce.

What is claimed is:

1. A method for transmitting a bearer control mode, comprising: in a roaming scenario,
 a home policy control and charging rules function entity (hPCRF) setting a bearer control mode of an IP connectivity access network (IP-CAN) session, and sending the bearer control mode of the IP-CAN session to a visited policy control and charging rules function entity (vPCRF) through an S9 subsession corresponding to the IP-CAN session;
 wherein the bearer control mode is used for the IP-CAN session corresponding to the S9 subsession
 wherein, in the step of setting the bearer control mode of the IP-CAN session, the hPCRF sets the bearer control mode of the IP-CAN session according to network requested support (NRS), access network information, subscription information and network policy.

2. The method of claim 1, further comprising:
 the vPCRF sending the bearer control mode of the IP-CAN session or the bearer control mode of the gateway control session to a policy and charging enforcement function entity (PCEF) or a bearer binding and event reporting function entity (BBERF).

3. The method of claim 1, wherein, before the step of setting the bearer control mode of the IP-CAN session, the method further comprises: the vPCRF sending the NRS to the hPCRF through the S9 subsession corresponding to the IP-CAN session.

4. A system for transmitting a bearer control mode in a roaming scenario, comprising a home policy control and charging rules function entity (hPCRF) and a visited policy control and charging rules function entity (vPCRF), wherein,
 the hPCRF is configured to set a bearer control mode of an IP connectivity access network (IP-CAN) session, and send the set bearer control mode to the vPCRF through an S9 subsession corresponding to the IP-CAN session;
 wherein the bearer control mode is used for the IP-CAN session corresponding to the S9 subsession;
 wherein,
 the hPCRF is configured to set the bearer control mode of the IP-CAN session according to network requested support (NRS), access network information, subscription information and network policy.

5. The system of claim 4, wherein,
 the vPCRF is configured to send the bearer control mode of the IP-CAN session to a policy and charging enforcement function entity (PCEF) or a bearer binding and event reporting function entity (BBERF).

6. A home policy control and charging rules function entity (hPCRF), wherein,
 the hPCRF is configured to set a bearer control mode of an IP connectivity access network (IP-CAN) session, and send the set bearer control mode to a visited policy control and charging rules function entity (vPCRF) through an S9 subsession corresponding to the IP-CAN session;
 wherein the bearer control mode is used for the IP-CAN session corresponding to the S9 subsession;
 wherein,
 the hPCRF is configured to set the bearer control mode of the IP-CAN session or gateway control session according to network requested support (NRS), access network information, subscription information and network policy.

* * * * *